UNITED STATES PATENT OFFICE.

REINHOLD GRÜTER AND HEINRICH POHL, OF CHARLOTTENBURG, GERMANY, ASSIGNORS TO CHEMISCHE WERKE VORM. DR. HEINRICH BYK, OF CHARLOTTENBURG, GERMANY, A CORPORATION OF GERMANY.

STABLE MIXTURE FOR PRODUCING HYDROGEN PEROXID.

975,353.  Specification of Letters Patent. Patented Nov. 8, 1910.

No Drawing. Original application filed May 4, 1909, Serial No. 493,918. Divided and this application filed July 14, 1910. Serial No. 572,004.

*To all whom it may concern:*

Be it known that we, REINHOLD GRÜTER and HEINRICH POHL, citizens of the German Empire, residing at Charlottenburg, in said Empire of Germany, have invented certain new and useful Improvements in Stable Mixtures of Perborates for Producing Hydrogen Peroxid, of which the following is a specification.

In a prior application for Letters Patent, Serial No. 493,918, filed May 4, 1909, we have described that completely or partially dehydrated perborates form together with solid acid substances stable mixtures which yield hydrogen peroxid on coming into contact with water. We have further found that when such substances are mixed with sugars, products are obtained which are of great value. While, for instance, mixtures of completely or partially dehydrated perborates and acid substances should for daily use be brought only in solution into contact with the mucous membrane of the cavity of the mouth, mixtures to which sugars have been added may be taken undissolved. They are applied in powder form, and particularly in the form of tablets which may be produced of such mixtures. The new products yield, as soon as they dissolve in the mouth, hydrogen peroxid *in statu nascendi* as the most effective substance. To the formation of this substance the disinfecting, protecting and bleaching effect is due, which has been determined for these products. Perfumes or flavoring substances may also be added.

Example: 100 parts by weight of finely ground sodium perborate containing 1 molecule of water of crystallization, are mixed with 64 parts by weight of finely ground dehydrated citric acid and 1000 parts by weight of a dry sugar. The powder obtained may be compressed into tablets.

What we claim is:

1. The herein described new solid stable mixtures of perborates containing a less quantity of water of crystallization than completely hydrated perborates, solid acid substances and sugar, yielding hydrogen peroxid with water.

2. The herein described new solid stable mixture of finely ground perborates containing a lesser quantity of water of crystallization than the completely hydrated perborates, finely ground solid acid substances and sugar, said mixture yielding hydrogen peroxid with water.

In testimony, that we claim the foregoing as our invention, we have signed our names in presence of two subscribing witnesses.

REINHOLD GRÜTER.
HEINRICH POHL.

Witnesses:
HENRY HASPER,
WOLDEMAR HAUPT.